(12) United States Patent
Hinson

(10) Patent No.: US 7,275,634 B1
(45) Date of Patent: Oct. 2, 2007

(54) BELT SCRAPER ASSEMBLY FOR CONVEYOR BELT SYSTEM

(76) Inventor: Michael D. Hinson, 119 Gable Way, Madera, CA (US) 93637

( * ) Notice: Subject to any disclaimer, the term of this patent is extended or adjusted under 35 U.S.C. 154(b) by 0 days.

(21) Appl. No.: 11/521,940

(22) Filed: Sep. 15, 2006

(51) Int. Cl.
*B65G 45/16* (2006.01)
(52) U.S. Cl. ...................................... 198/499; 198/497
(58) Field of Classification Search ................ 198/497, 198/499
See application file for complete search history.

(56) References Cited

U.S. PATENT DOCUMENTS

| | | | | |
|---|---|---|---|---|
| 3,795,308 A | * | 3/1974 | Oury | 198/499 |
| 3,994,388 A | * | 11/1976 | Reiter | 198/499 |
| 4,541,523 A | | 9/1985 | Stockton | |
| 4,787,500 A | | 11/1988 | Holz | |
| 5,622,249 A | * | 4/1997 | Morin | 198/499 |
| 5,845,761 A | * | 12/1998 | Davidts et al. | 198/499 |
| 5,865,997 A | * | 2/1999 | Isaacs | 198/499 |
| 6,152,290 A | * | 11/2000 | Mott et al. | 198/499 |
| 6,360,875 B1 | | 3/2002 | Altemus, Jr. et al. | |
| 6,439,373 B1 | * | 8/2002 | Swinderman | 198/499 |

* cited by examiner

*Primary Examiner*—James R. Bidwell
(74) *Attorney, Agent, or Firm*—Richard A. Ryan

(57) ABSTRACT

An improved belt scraper assembly for use in a conveyor belt system to scrape debris off of a conveyor belt comprises a support bar having scraper blade attached thereto that is biased against the conveyor belt by a spring at both ends of the support bar. Ends of the support bar pivotally attach to brackets mounted on spaced apart frame members. A second bracket is mounted on a side of each frame member. One end of each spring attaches to an end of the support bar. The other end of the spring attaches to the second bracket to bias an edge of the scraper blade against the conveyor belt. When this edge wears down, the operator flips the support member over to utilize the opposite edge of the scraper blade without stopping the conveyor system. When both edges are worn down, the operator replaces the blade without stopping the system.

20 Claims, 3 Drawing Sheets

BELT SCRAPER ASSEMBLY FOR CONVEYOR BELT SYSTEM

CROSS-REFERENCE TO RELATED APPLICATIONS

None.

BACKGROUND OF THE INVENTION

A. Field of the Invention

The field of the present invention relates generally to conveyor belt systems configured for carrying bulk materials thereon. More particularly, the present invention relates to belt scraper assemblies used with such systems to remove unwanted materials from the surface of the conveyor belt. Even more particularly, the present invention relates to such conveyor belt scraper assemblies that are self-adjusting and which are configured to allow replacement of worn components without stopping the conveyor belt system.

B. Background

Continuous belt conveyor systems are commonly utilized to carry bulk materials, including trash, recyclables, gravel, coal, aggregate and many other types of materials, from one location to another, sometimes over long distances. One well known configuration for such conveyor systems has a continuous belt that comprises an upper flight section which carries the bulk materials to a location where it is dumped off the end of the conveyor belt for disposal or further processing and a lower flight section that returns the belt to a position where it can receive more bulk materials. A supporting framework supports roller assemblies, placed at appropriate intervals, over which the generally flexible belt travels in the upper and lower flight sections. To better maintain the bulk materials on the belt when traveling through the upper flight section, it is common to arrange the roller assemblies in the upper flight section in a generally trough or trough-like cross section that supports the belt in a corresponding configuration. These roller assemblies are commonly referred to as trough roller assemblies. The lower flight section is typically supported by return roller assemblies comprising a single roller that supports the flexible belt in a generally flat or horizontal configuration.

The carrying surface of the conveyor belt, which contacts the return roller assemblies in the lower flight section, typically becomes covered or coated with abrasive and/or corrosive debris from the materials carried by the conveyor belt system. As well known in the industry, the debris on the carrying surface of the conveyor belt is likely to damage the return roller assemblies, thereby creating jagged or sharp edges on its rolling surfaces that will in turn cut into the conveyor belt. Replacing the conveyor belt in such systems is expensive and results in substantial system downtime, which can be even more expensive for the conveyor belt system operator than the cost of the belt. In addition, the debris on the surface of the conveyor belt can damage the conveyor belt system equipment by getting into the bearings of the return roller assemblies and/or falling into other operational equipment that is used to operate the system. This debris can also fall on to the floor and create operational and safety issues for the system operator. To avoid these problems, most conveyor belt systems utilize one or more belt scrapers to scrape the debris off of the carrying surface of the conveyor belt, typically while on its return flight in the lower flight section, while it is moving.

The present invention is directed to an improved belt scraper assembly for use with conveyor belt systems to clean the carrying surface of the conveyor belt. The prior art belt scrapers generally attach to the supporting framework in a manner that directs the scraper blade up against the downward facing carrying surface of the conveyor belt. Unfortunately, the way in which the prior art belt scrapers attach and operate make replacement of worn or damaged scraper blades very difficult. In addition, the prior art belt scrapers have a somewhat complicated configuration that makes them more expensive, difficult to use and likely to breakdown, particularly due to the debris from materials carried by the conveyor belt system. An additional well known problem with prior art belt scrapers is that they typically require the conveyor belt system to be stopped for a period of time in order to replace the scraper blade, which results in downtime for the conveyor belt system operator. Yet another problem with most prior art belt scrapers is that they are not self-adjusting, meaning that they do not compensate for wear of the scraper blade over time. Because scraper blades are preferably made out of materials that are softer than the conveyor belt to reduce wear on the conveyor belt, without some type of self-adjusting feature the scraper blade will separate from the surface of the conveyor belt as it wears down due to the movement of the conveyor belt and the debris. To avoid this problem, some prior art belt scraper assemblies utilize metal or other hard materials for the scraper blade. Unfortunately, this increases the risk of damage to the conveyor belt.

Several prior art patents address some of the problems associated with belt scrapers. For instance, U.S. Pat. No. 4,541,523 to Stockton discloses a conveyor belt scraper that has a track arrangement positioned below the conveyor belt, a carriage that slidably engages the track arrangement, a locking mechanism that locks the carriage to the track arrangement, a plurality of aligned scraper blade assemblies and at least one coil spring arrangement connecting the scraper blade assemblies to the carriage so as to bias the blades against the surface of the conveyor belt against the direction of belt travel. The scraper includes a counterweight that biases the blades against the conveyor belt in a manner that is configured to compensate for wear of the blades. U.S. Pat. No. 4,787,500 to Holz discloses a conveyor belt scraper having a scraper element that is slidably received in a mounting plate disposed below the conveyor belt with a biasing mechanism below the mounting plate to bias the elastomeric blade portion of the scraper element against the downward facing surface of the conveyor belt. The biasing mechanism compensates for blade wear and the use of slidably received scraper elements is configured to allow replacement of the scraper elements without shutting down the conveyor belt.

Despite the advancements offered by the prior art patents, what is needed is an improved configuration for a conveyor belt scraper assembly that is configured to effectively scrape debris off of the carrying surface of a moving conveyor belt. The preferred belt scraper assembly is configured to scrape debris off the downward facing carrying surface in the lower flight section of a continuous belt conveyor system. Preferably, the belt scraper assembly should enable the operator to simply and quickly replace the worn scraper blade without having to stop the conveyor belt system. The preferred belt scraper assembly should utilize a scraper blade that is softer than the conveyor belt, to reduce risk of damage to the conveyor belt, and effectively compensate for wear of the scraper blade so as to maintain its scraping effectiveness. Preferably the belt scraper assembly should more efficiently utilize the scraper blade materials so as to reduce the frequency of having to replace the scraper blade. The preferred scraper belt assembly should be relatively inexpensive and simple to install and easy to operate.

SUMMARY OF THE INVENTION

The improved return roller assembly of the present invention solves the problems and provides the benefits identified above. That is to say, the present invention discloses an improved belt scrape assembly that effectively scrapes debris off of the carrying surface of a conveyor belt and which is configured to reduce the need for maintenance and replacement of the scraper blade, thereby reducing the cost of operating conveyor belt systems and improving their operating efficiency. The belt scraper assembly of the present invention utilizes a sacrificial scraper blade, such that it wears before the conveyor belt, to reduce wear on the conveyor belt and a wear compensating arrangement to maintain a scraping edge against the downward facing carrying surface of the conveyor belt. The present belt scraper assembly allows nearly full utilization of the scraper blade so as to reduce the cost of scraper blade replacement. When the scraper blade is sufficiently worn that it must be replaced, the belt scraper assembly of the present invention allows quick and easy replacement of the worn component without stopping movement of the conveyor belt system. The belt scraper assembly of the present invention has a minimum number of moving parts and utilizes materials and components that are generally readily available, providing a relatively cost effective conveyor belt system. In addition, the belt scraper assembly of the present invention is readily adaptable to a variety of different conveyor belt and/or conveyor belt system configurations.

In the primary embodiment of the present invention, the belt scraper assembly is configured for use with a conveyor belt system to scrape debris off of a surface of the conveyor belt, typically the surface that carries the bulk materials, so as to prevent the debris from damaging the components of the conveyor belt system. In the preferred embodiment, the belt scraper assembly comprises an elongated support bar that extends between two spaced apart frame members of the system's supporting framework, a scraper blade that attaches to the support bar and a biasing mechanism to bias the scraper blade against the surface of the conveyor belt. The scraper blade has a first edge that extends outwardly beyond the first edge of the support bar and an opposite facing second edge that extends outwardly beyond the second edge of the support bar. Preferably, a bar bracket is attached to the underside of the frame members and the first and second ends of the support bar pivotally attach to the bar bracket with a removable pivot pin, secured in place with a securing mechanism, to dispose the support bar and attached scraper blade in spaced apart relation to the surface of the conveyor belt. A spring bracket attaches to a side of each of the frame members above the conveyor belt. One end of each biasing mechanism, which is preferably a coiled spring, attaches to an end of the support bar. The other end of the spring attaches to the spring bracket to bias the first edge of the scraper blade against the surface of the conveyor belt. The spring provides sufficient biasing force that the first edge of the scraper blade will scrape the debris off of the conveyor belt surface. As the first edge of the scraper blade wears down, the spring will continue to bias it against the conveyor belt, making the system self-adjusting. Once the first edge of the scraper blade is substantially worn down, the operator disengages the securing mechanism and removes the pin so that he or she may flip the support bar over to engage, once the pin is reinserted and the securing mechanism engaged, a second edge of the scraper blade against the surface of the conveyor belt. In this manner, the operator will obtain longer life from the scraper blade. Switching to the second edge of the scraper blade is accomplished without stopping the conveyor belt system. Once the second edge is worn down, the operator removes the support bar and spring from their respective brackets and either replaces the scraper blade on the existing support bar or replaces the support bar with one that has a new scraper blade thereon. As with switching edges, this can be accomplished without turning off the conveyor belt system.

Accordingly, the primary objective of the present invention is to provide a belt scraper assembly for conveyor belt systems that provides the advantages discussed above and overcomes the disadvantages and limitations associated with presently available belt scraper assemblies.

It is also an object of the present invention to provide an improved belt scraper assembly that effectively and efficiently removes debris from the carrying surface of a moving conveyor belt.

It is also an object of the present invention to provide an improved belt scraper assembly that biases a sacrificial scraper blade against the carrying surface of a moving conveyor belt in a manner that compensates for wear of the scraper blade so as to maintain an effective scraping relationship between the scraper blade and the conveyor belt.

It is also an object of the present invention to provide an improved belt scraper assembly that substantially utilizes the scraper blade before it needs replacement and which permits the operator to replace the scraper blade without stopping the conveyor belt system.

It is also an object of the present invention to provide an improved belt scraper assembly that has a minimum number of moving parts, making it relatively inexpensive and simple to install and less likely to malfunction in the debris-laden environments of most conveyor belt systems.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
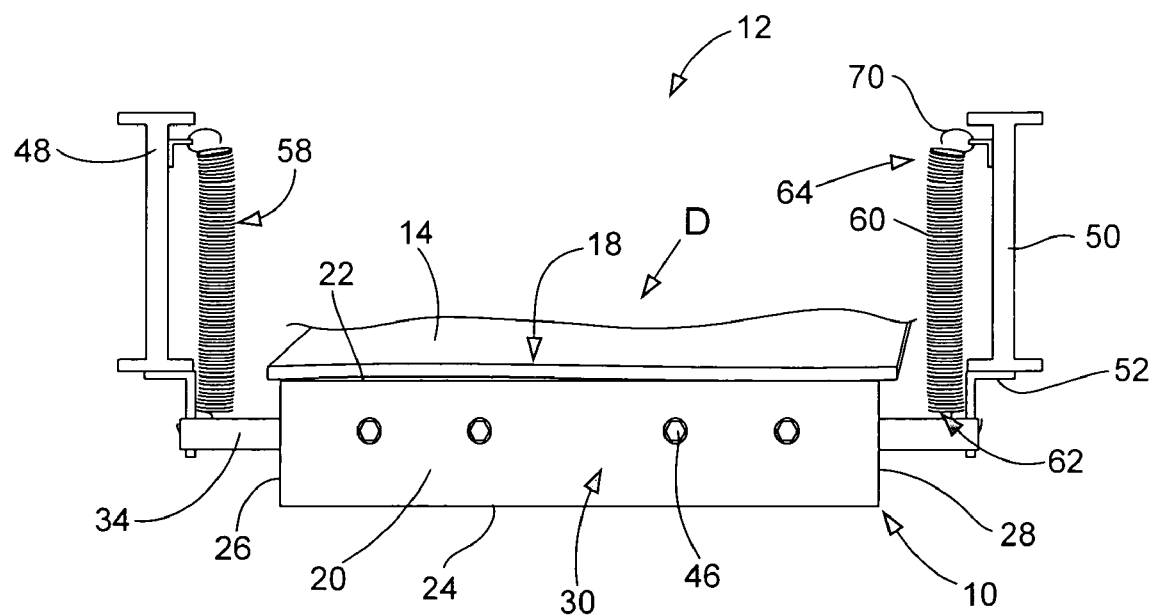
FIG. 1 is a front view of a portion of a conveyor belt system showing a belt scraper assembly configured according to a preferred embodiment of the present invention in use to scrape the downward facing carrying surface of a conveyor belt in the lower flight section.

With reference to the figures where like elements have been given like numerical designations to facilitate the reader's understanding of the present invention, the preferred embodiments of the present invention are set forth below. The enclosed figures and drawings are merely illustrative of a preferred embodiment and represent one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily directed to a belt scraper assembly utilized in a continuous conveyor belt system having the return flight section disposed below the upper, material carrying flight section, those skilled in the art will readily understand that this is shown merely for purposes of simplifying the present disclosure and that the present invention is not so limited.

A belt scraper assembly that is manufactured out of the components and configured pursuant to a preferred embodiment of the present invention is shown generally as 10 in the figures. Belt scraper assembly 10 is preferably and beneficially utilized in a conveyor belt system 12 having a conveyor belt 14 that is moving in the direction indicated as D in FIGS. 1 and 2. In one configuration of conveyor belt system 12, not shown in detail, conveyor belt 14 moves in a continuous loop through an upper flight section, in which conveyor belt 14 is typically formed by a trough roller assembly into a trough or trough-like cross-section, that is utilized to carry bulk materials to a place for processing or disposal and a lower flight section that utilizes return rollers to support conveyor belt 14 on its return to the upper flight section where it will receive more bulk materials thereon. In such systems, belt scraper assembly 10 can be beneficially utilized to scrape debris remaining from the bulk materials off of the downward facing carrying surface 16 of conveyor belt 14 prior to it being supported by the return rollers so as to avoid the debris on the conveyor belt 14 damaging the return roller assemblies. The upwardly facing (in the lower flight section shown) support surface 18 of conveyor belt 14 will move across and be supported by the trough roller assemblies in the upper flight section as the carrying surface 16, which will then be upwardly facing, carries the bulk materials thereon. As will be readily apparent to those skilled in the art of conveyor belt systems, various configurations of conveyor belt system 12 are suitable for use with the belt scraper assembly 10 of the present invention.

Figure 2:
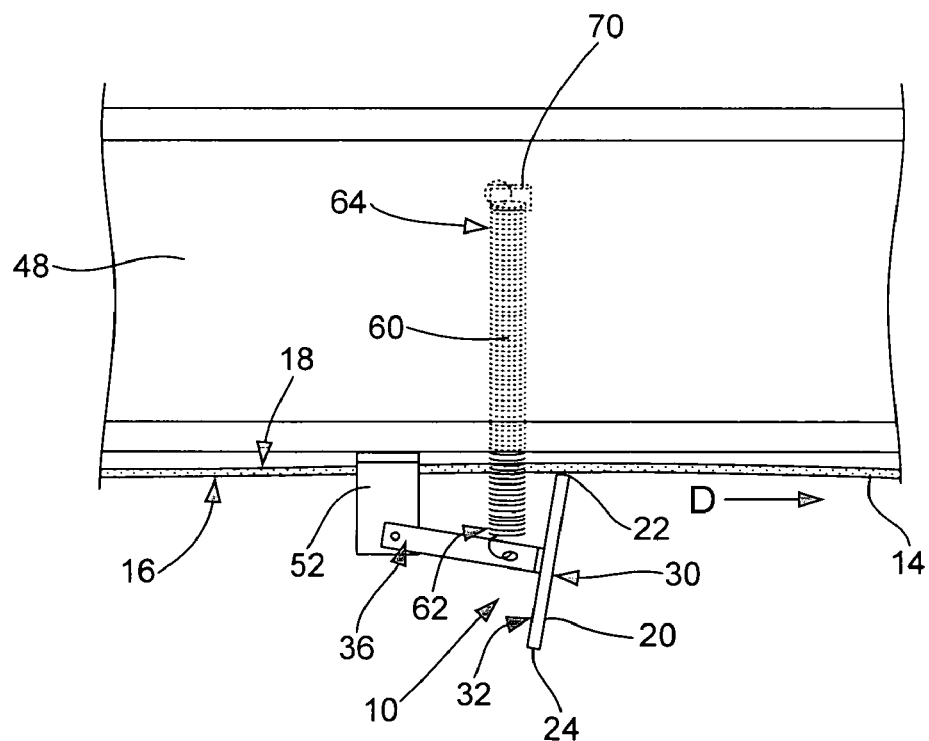
FIG. 2 is a side view of the portion of a conveyor belt system shown in FIG. 1.
Figure 3:
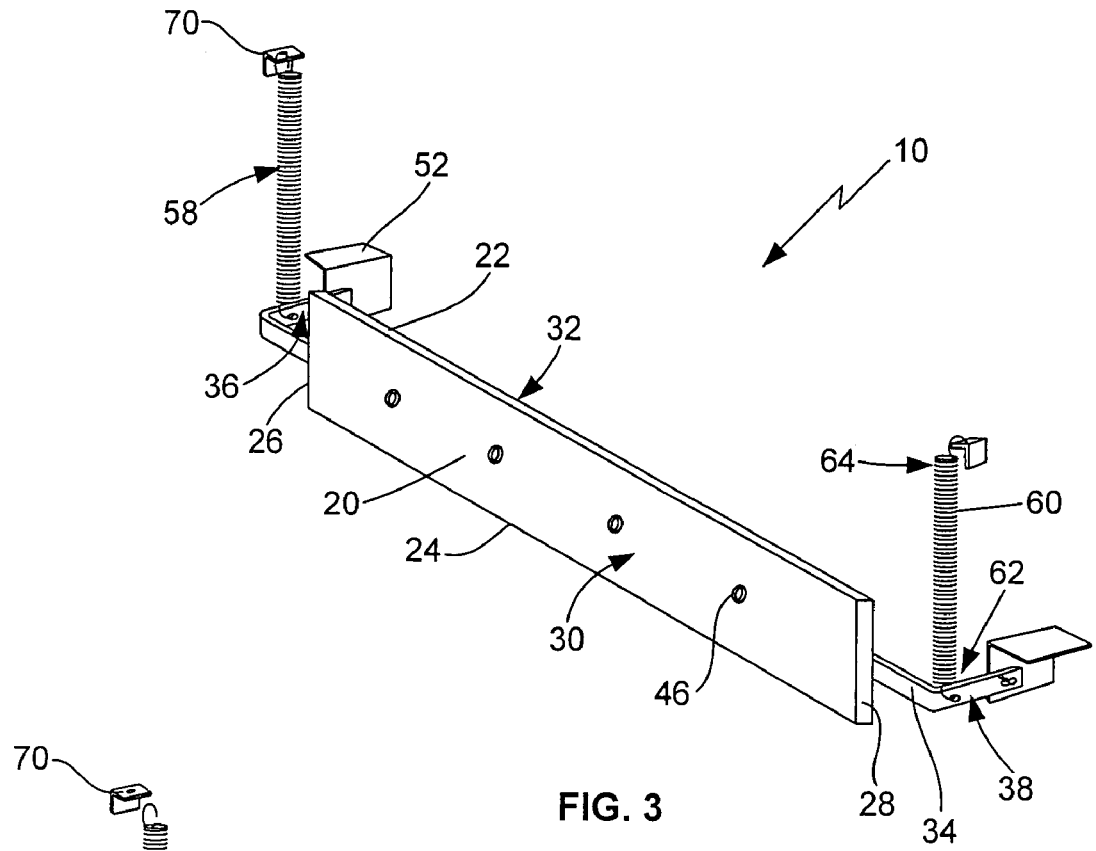
FIG. 3 is a top front perspective view of a belt scraper assembly configured according to a preferred embodiment of the present invention.
Figure 4:
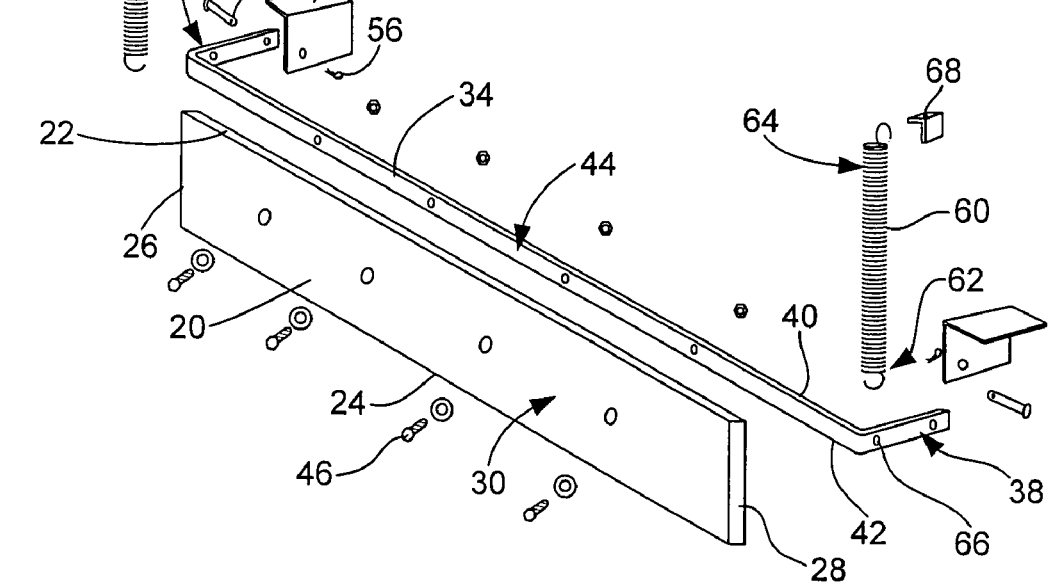
FIG. 4 is an exploded view of the belt scraper assembly of FIG. 3.
Figure 5:
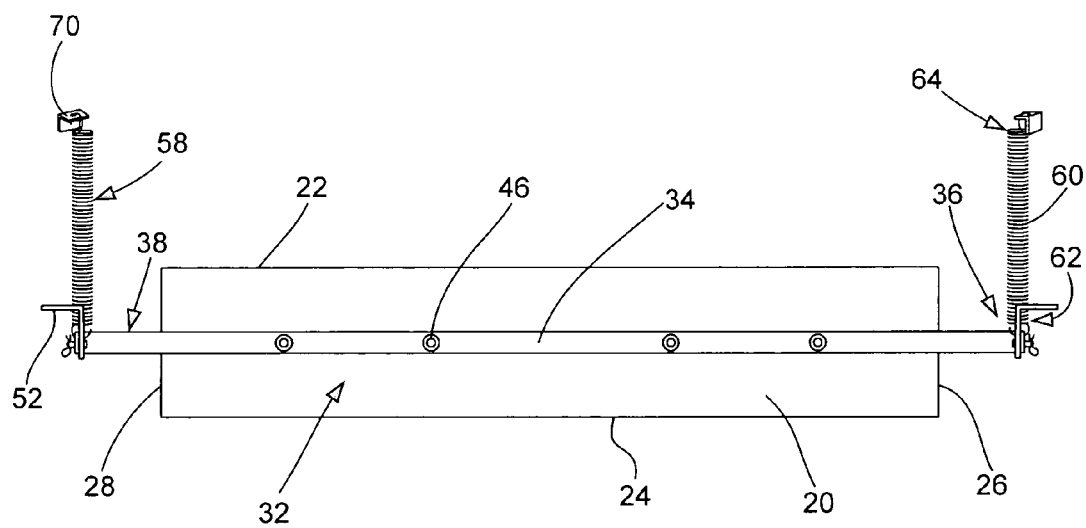
FIG. 5 is a back view of the belt scraper assembly of FIG. 3.

In a preferred embodiment, as best shown in FIGS. 3 through 5, belt scraper assembly 10 comprises an elongated, generally rectangular-shaped scraper blade 20 having a first edge 22 and an opposite facing second edge 24, a first end 26 and an opposite second end 28, and a forward face 30 that faces in the direction from which conveyor belt 14 is coming (i.e., upstream) and an opposite facing rearward face 32 that faces the direction of travel for conveyor belt 14 (i.e., downstream). In FIGS. 1 and 2, first edge 22 of scraper blade 20 is disposed upwardly by belt scraper assembly 10 against carrying surface 16 of conveyor belt 14 to scrape debris therefrom as conveyor belt 14 moves in direction D. As set forth in more detail below, belt scraper assembly 10 is configured such that second edge 24 can, alternatively, be forced upward against carrying surface 16 when first edge 22 becomes substantially worn down due to contact with conveyor belt 14 and the debris thereon. In the preferred embodiment, scraper blade 20 is made from an elastomeric material, such as natural or synthetic rubber, that can be made sufficiently stiff to accomplish the desired scraping effect yet be softer than the material utilized for conveyor belt 14 such that contact between scraper blade 20 and conveyor belt 14 will wear away at scraper blade 20 and not, substantially, at conveyor belt 14. Naturally, to avoid excessive replacement costs, it is preferred that the material for belt scraper 20 be chosen so as to not wear too fast.

Belt scraper assembly 10 also comprises an elongated support bar 34, best shown in FIGS. 4 and 5, that is attached to scraper blade 20 in manner that supports scraper blade 20 below carrying surface 16 of conveyor belt 14 in the configuration of conveyor belt system 12 shown in FIGS. 1 and 2. As set forth in more detail below, support bar 34 must be sufficiently stiff so as to be able to forcibly direct first edge 22 or second edge 24 of scraper blade 20 against carrying surface 16 while conveyor belt 14 is moving in direction D. In one embodiment, shown in the figures, support bar 34 is made out of metal, such as steel or the like, and is provided with generally L-shaped first end 36 and second end 38 and first (i.e., top) edge 40 and second (i.e., bottom) edge 42. As will be recognized by those skilled in the art, support bar 34 can be made out of a variety of different materials, including some plastics and composites, suitable for supporting scraper blade 20 against conveyor belt 14, and with different shaped first 36 and second 38 ends. In the preferred embodiment, scraper blade 20 and support bar 34 are cooperatively configured such that scraper blade 20 is removably attached to support bar 34 to allow removal of scraper blade 20 from support bar 34 for replacement of scraper blade 20 when both first 22 and second 24 edges thereof become substantially worn. In the embodiment shown in the figures, the planar forward side 44 of support bar 34 is placed in abutting relation with the rearward face 32 of scraper blade 20 and they are held together by one or more connecting elements 46, such as the bolts and nuts shown in the figures. Various other mechanisms for removably attaching scraper blade 20 to support bar 34, including screws, projections/apertures and the like, can be used with the present invention. Depending on the costs of materials for support bar 34 relative to the difficulty and cost of replacing scraper blade 20 therefrom, it may be desirable to have scraper blade 20 fixedly attached to support bar 34 such that the entire support bar 34 and scraper blade 20 (that which remains when worn down) are disposed of together.

The first 36 and second 38 ends of support bar 34 pivotally attach to the supporting framework, such as first frame member 48 and spaced apart second frame member 50, of conveyor belt system 12 to dispose support bar 34 in spaced apart relation to the surface of conveyor belt 14 to be scraped. In the preferred embodiment shown in the figures, support bar 34 is disposed below carrying surface 16 of conveyor belt 14. In one configuration, first end 36 of support bar 34 pivotally attaches to first frame member 48 and second end 38 pivotally attaches to second frame member 50. In the preferred embodiment, a bar mounting assembly 51, best shown in FIG. 4 and comprising bar bracket 52, pin 54 and securing mechanism 56, is utilized to secure the ends 36 and 38 of support bar to their respective frame members. As shown, bar bracket 52 is disposed between the ends 36 and 38 of support bar 34 and their respect frame members 48 and 50 to avoid having to directly attach support bar 34 to frame members 48 and 50. Bar bracket 52 attaches to each of first frame member 48 and second frame member 50, and the first end 36 and second end 38 of support bar 34 pivotally attach to their respective bar brackets 52. A bar bracket 52 can be fixedly attached, such as by welding or the like, to the bottom area of each of first 48 and second 50 frame members, with a portion of the bar bracket 52 extending generally downwardly therefrom. Preferably, a removable pin 54, or the like, pivotally interconnects the ends 36 and 38 of support bar 34 to the downwardly projecting portion of their respective bar brackets 52 to allow support bar 34 to pivotally direct scraper blade 20 against carrying surface 16 and to allow the operator to quickly and easily separate support bar 34, at its ends 36 and 38, from first 48 and second 50 frame members. Preferably, pin 54 is chosen to allow support bar 34 to pivot substantially freely with respect to bar bracket 52. As set forth below, pin 54 being removable allows the operator to extend the life of scraper blade 20 by flipping belt scraper assembly 10 such that the second edge 24 is directed against carrying surface 16 when first edge 22 is worn down from contact with conveyor belt 14 and the debris thereon. In a preferred configuration, removable pin 54 extends through the ends 36 and 38, respectively, of support bar 34 and through bar bracket 52 and is secured in place therein by a securing mechanism 56, such as a cotter pin or the like.

With the ends 36 and 38 of support bar 34 pivoting relative to first 48 and second 50 frame members, a biasing mechanism 58 is provided to bias either the first edge 22 or the second edge 24 of scraper blade 20 against carrying surface 16 of conveyor belt 14, as shown in FIGS. 1 and 2, to scrape the debris therefrom as it moves in direction D. In the preferred embodiment, a biasing mechanism 58 is located at or near each of the first end 36 and second end 38 of support bar 34 to interconnect the first end 36 to first frame member 48 and second end 38 to second frame member 50. Preferably, biasing mechanism 58 is configured to forcibly direct either first edge 22 or second edge 24 of scraper blade 20 against carrying surface 16 in a manner that scrapes substantially all of the debris off of conveyor belt 14 to avoid the debris damaging the components of conveyor belt system 12. In one embodiment, biasing mechanism 58 is a spring 60 having a first end 62 that attaches to an end 36 or 38 of support bar 34 and a second end 64 that attaches to either of first frame member 48 or second frame member 50, respectively. Spring 60 should have sufficient biasing force to sufficiently engage first edge 22 or second edge 24 of scraper blade 20 against carrying surface 16 of conveyor belt 14 to remove even stuck debris therefrom.

The ends 62 and 64 of spring 60 are attached to frame members 48 and 50 in a manner that allows the operator to disengage securing mechanism 56, remove pin 54 and flip support bar 34 over to direct the second edge 24 of scraper blade 20 against carrying surface 16, which will result in forward face 30 of scraper blade 20 facing rearward (downstream). In an alternative embodiment, the ends 62 and 64 of spring 60 are removably attached to at least one of the frame members 48 and 50 or the ends 36 and 38 of support bar 34 so that support bar 34, with scraper blade 20 attached thereto, can be removed and flipped over to direct second edge 24 instead of first edge 22 of scraper blade 20 against carrying surface 16 with forward face 30 of scraper blade 20 remaining facing forward (upstream). Either configuration allows the operator to extend (i.e., double) the life of scraper blade 20 by utilizing both edges 22 and 24 thereof. In one embodiment, first end 62 of spring 60 is configured to engage a first aperture 66 in the L-shaped end portions of ends 36 and 38 of support bar 34 and the second end 64 of spring 60 is configured to engage an aperture (not shown) in first 48 or second 50 frame member. In the preferred embodiment, however, second end 64 of spring 60 engages a second aperture 68 in an L-shaped spring bracket 70, best shown in FIGS. 3 through 5, that is attached to the side of first 48 or second 50 frame members, as shown in FIGS. 1 and 2. Spring bracket 70 is disposed between the second end 64 of spring 60 and first 48 or second 50 frame member, depending whether at first end 36 or second end 38 of support bar 34. In a preferred embodiment, a spring bracket 70 is welded or otherwise securely attached to each of the first frame member 48 and second frame member 50, as shown in FIG. 1, with first end 62 of spring 60 engaged in first aperture 66 at each of first end 36 and second end 38 of support bar 34 and second end 64 of spring 60 engaged in second aperture 68 of spring bracket 70. In this manner, spring 60 interconnects support bar 34 and frame members 48 and 50 to bias scraper blade 20 towards carrying surface 16 of conveyor belt 14 so that first edge 22 or second edge 24 can scrape debris off of carrying surface 16 while conveyor belt 14 is moving.

Belt scraper assembly 10 of the preferred embodiment of the present invention is installed in conveyor belt system 12 by welding one side of the L-shaped bar bracket 52 to the underside of each of first frame member 48 and second frame member 50 and then welding one side of the L-shaped spring bracket 70 to the side of each of first frame member 48 and second frame member 50. As shown in FIGS. 1 and 2, spring bracket 70 needs to be placed a sufficient distance up on first 48 and second 50 frame members to provide the desired biasing force for spring 60, the exact distance of which will depend on the type and size of spring utilized. A support bar 34 having scraper blade 20 attached thereto and a spring 60 are obtained. The first 36 and second 38 ends of support bar 34 are aligned with bar brackets 52 and pin 54 is inserted through apertures in the ends 36/38 and bar bracket 52 and secured in place with securing mechanism 56. With support bar 34 able to pivot freely on pin 54, the operator engages the first end 62 of spring 60 into first aperture 66 of bar bracket 52 and the second end 64 of spring 60 into second aperture 68 of spring bracket 70. The biasing force of spring 60 will bias support bar 34 upward (in the embodiment shown) to forcibly engage first edge 22 of scraper blade 20 against carrying surface 16. When the conveyor belt system 12 is turned on, the movement of conveyor belt 14 against first edge 22, which is being biased against carrying surface 16, will cause first edge 22 to dislodge or otherwise scrape the debris off of carrying surface 16, thereby preventing damage to the components of conveyor belt system 12.

Because the material for scraper blade 20 is softer than that for the conveyor belt 14, the scraper blade 20 will wear away. As it wears away, spring 60 continues to bias the first edge 22, which has moved closer to the center of scraper blade 20, against carrying surface 16 to continue to scrape debris away. When the portion of scraper blade 20 having first edge 22 is substantially worn away, the operator merely disengages securing mechanism 56, removes pin 54 and flips support member 34 over to bias (after reinserting pin 54 and engaging securing mechanism 56) second edge 24 of scraper blade 20 against carrying surface 16, without stopping conveyor belt system 12. When second edge 24 of scraper blade 20 also wears away, the operator removes one end 62 or 64 of spring 60, disengages securing mechanism 56 and removes pin 54 to take support bar 34 off, with the worn scraper blade 20 thereon. The operator either installs a new support bar 34, having a new scraper blade 20 thereon, or removes the scraper blade 20 from the existing support bar 34 and replaces it with a new scraper blade 20 and then reinstalls the existing support bar 34. As with changing to second edge 24, replacing scraper blade 20 can be accomplished without the need to shut down conveyor belt system 12. As set forth above, the belt scraper assembly 10 of the present invention allows the operator to obtain a longer life from the scraper blade 20 and quickly and easily exchange a worn scraper blade 20 for a new one without shutting down the conveyor belt system 12 and sustaining the loss in productivity associated therewith.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A belt scraper assembly configured to scrape debris off of a surface of a conveyor belt in a conveyor belt system having a supporting framework, said belt scraper assembly comprising:
   an elongated support bar having a first end, a second end, a first edge and a second edge, each of said first end and said second end of said support bar pivotally attached to said supporting framework so as to dispose said support bar in spaced apart relation to said surface of said conveyor belt;
   an elongated scraper blade having a first edge and an opposite facing second edge, said support bar attached to said scraper blade between said first edge and said second edge of said scraper blade so as to dispose said first edge of said scraper blade outwardly of said first edge of said support bar and said second edge of said scraper blade outwardly of said second edge of said support bar, both of said first edge and said second edge of said scraper blade configured to selectively scrape debris from said surface of said conveyor belt; and
   means interconnecting said support bar and said supporting framework for biasing one of said first edge or said second edge of said scraper blade against said surface of said conveyor belt.

2. The belt scraper assembly according to claim 1, wherein said scraper blade is made of material softer than the conveyor belt.

3. The belt scraper assembly according to claim 1, wherein said biasing means comprises a spring having a first end attached to said support bar and a second end attached to supporting framework.

4. The belt scraper assembly according to claim 3 further comprising a spring bracket disposed between said second end of said spring and said supporting framework.

5. The belt scraper assembly according to claim 4 further comprising a bar mounting assembly at each of said first end and said second end of said support bar for releasably and pivotally mounting said support bar to said supporting framework, said bar mounting assembly configured to selectively change the belt scraper assembly from said first edge of said scraper blade against said surface to said second edge of said scraper blade against said surface while said conveyor belt is moving.

6. The belt scraper assembly according to claim 1, wherein said scraper blade is removably attached to said support bar.

7. The belt scraper assembly according to claim 1 further comprising a bar mounting assembly at each of said first end and said second end of said support bar, said bar mounting assembly releasably and pivotally mounting said support bar to said supporting framework, said bar mounting assembly configured to selectively change the belt scraper assembly from said first edge of said scraper blade against said surface to said second edge of said scraper blade against said surface while said conveyor belt is moving.

8. The belt scraper assembly according to claim 7, wherein each of said bar mounting assemblies comprise a bar bracket attached to said support framework and a pin pivotally attaching said support bar to said bar bracket.

9. The belt scraper assembly according to claim 8, wherein each of said bar mounting assemblies further comprise a securing means for releasably securing said pin in said bar mounting assembly.

10. A belt scraper assembly configured to scrape debris off of a surface of a conveyor belt in a conveyor belt system having a supporting framework comprising at least a first frame member and a spaced apart second frame member, said belt scraper assembly comprising:
    an elongated support bar having a first end, a second end, a first edge and a second edge, said first end pivotally attached to said first frame member and said second end pivotally attached to said second frame member so as to dispose said support bar in spaced apart relation to said surface of said conveyor belt;
    an elongated scraper blade having a first edge and an opposite facing second edge, said support bar attached to said scraper blade between said first edge and said second edge of said scraper blade so as to dispose said first edge of said scraper blade outwardly of said first edge of said support bar and said second edge of said scraper blade outwardly of said second edge of said support bar, both of said first edge and said second edge of said scraper blade configured to selectively scrape debris from said surface of said conveyor belt;
    means at each of said first end and said second end of said support bar for biasing one of said first edge or said second edge of said scraper blade against said surface of said conveyor belt, said biasing means interconnecting said first end of said support bar to said first frame member and said second end of said support bar to said second frame member; and
    a bar mounting assembly at each of said first end and said second end of said support bar for releasably and pivotally mounting said support bar to said supporting framework, said bar mounting assembly configured to selectively change the belt scraper assembly from said first edge of said scraper blade against said surface to said second edge of said scraper blade against said surface while said conveyor belt is moving.

11. The belt scraper assembly according to claim 10, wherein said scraper blade is made of material softer than the conveyor belt.

12. The belt scraper assembly according to claim 10, wherein said biasing means comprises a spring having a first end attached to either of said first end or said second end of said support bar and a second end attached, respectively, to either said first frame member or said second frame member.

13. The belt scraper assembly according to claim 12 further comprising a spring bracket disposed between said second end of said spring and each of said first frame member and said second frame member.

14. The belt scraper assembly according to claim 13, wherein each of said bar mounting assemblies comprise a bar bracket attached to said support framework and a pin pivotally attaching said support bar to said bar bracket.

15. The belt scraper assembly according to claim 10, wherein said scraper blade is removably attached to said support bar.

16. The belt scraper assembly according to claim 10, wherein each of said bar mounting assemblies comprise a bar bracket attached to said support framework and a pin pivotally attaching said support bar to said bar bracket.

17. The belt scraper assembly according to claim 16, wherein each of said bar mounting assemblies further comprise a securing means for releasably securing said pin in said bar mounting assembly.

18. A belt scraper assembly configured to scrape debris off of a surface of a conveyor belt in a conveyor belt system having a supporting framework comprising at least a first frame member and a spaced apart second frame member, said belt scraper assembly comprising:

- a bar bracket at each of said first frame member and said second frame member;
- an elongated support bar having a first end, a second end, a first edge and a second edge, said first end pivotally attached to said bar bracket on said first frame member and said second end pivotally attached to said bar bracket on said second frame member so as to dispose said support bar in spaced apart relation to said surface of said conveyor belt;
- an elongated scraper blade attached to said support bar, said scraper blade having a first edge and an opposite facing second edge, each of said first edge and said second edge configured to selectively scrape debris from said surface of said conveyor belt, said support bar attached to said scraper blade between said first edge and said second edge of said scraper blade so as to dispose said first edge outwardly beyond said first edge of said support bar and said second edge outwardly beyond said second edge of said support bar, said bar bracket configured to selectively change said belt scraper assembly from said first edge of said scraper blade against said surface to said second edge of said scraper blade against said surface while said conveyor belt is moving;
- a spring bracket attached to each of said first frame member and said second frame member; and
- a spring at each of said first end and said second end of said support bar, each spring having a first end attached to said first end or said second end of said support bar and a second end attached, respectively, to said spring bracket on said first frame member and said spring bracket on said second frame member, said spring configured to bias one of said first edge or said second edge of said scraper blade against said surface of said conveyor belt.

19. The belt scraper assembly according to claim 18, wherein a pin removably attaches each of said first end and said second end of said support bar to their respective said bar brackets.

20. The belt scraper assembly according to claim 19 further comprising a securing means for releasably securing said pin in said bar mounting assembly.

* * * * *